United States Patent
Gauthier

[11] Patent Number: 5,586,998
[45] Date of Patent: Dec. 24, 1996

[54] CO-CURRENT CYCLONE SEPARATION EXTRACTOR

[75] Inventor: Thierry Gauthier, Saint Genis Laval, France

[73] Assignee: Institut Francais Du Petrole, Rueil Malmaison, France

[21] Appl. No.: 373,535

[22] Filed: Jan. 17, 1995

Related U.S. Application Data

[63] Continuation of Ser. No. 985,712, Dec. 4, 1992, abandoned.

[30] Foreign Application Priority Data

Dec. 5, 1991 [FR] France .................................. 91 15063

[51] Int. Cl.$^6$ .................................................. B01D 53/24
[52] U.S. Cl. .......................................... 55/391; 210/512.1
[58] Field of Search ............................. 210/787, 512.1; 55/468, 474, 476, 391, 392, 396, 397, 398, 426, 459.1, 451, 450, 448, 394, 423, 444

[56] References Cited

U.S. PATENT DOCUMENTS

| | | | |
|---|---|---|---|
| 4,414,100 | 11/1983 | Krug et al. ............................. | 208/153 |
| 4,455,220 | 6/1984 | Parker et al. ........................... | 208/161 |
| 5,053,082 | 10/1991 | Flanigan et al. ...................... | 134/26 X |
| 5,123,939 | 6/1992 | Morin et al. ............................. | 55/218 |
| 5,186,836 | 2/1993 | Gauthier et al. . | |

FOREIGN PATENT DOCUMENTS

| | | |
|---|---|---|
| 0139390 | 5/1985 | European Pat. Off. . |
| 0169008 | 1/1986 | European Pat. Off. . |
| 0250046 | 12/1987 | European Pat. Off. . |
| 0461003 | 12/1991 | European Pat. Off. . |

*Primary Examiner*—Frank Spear
*Attorney, Agent, or Firm*—Millen, White, Zelane, & Branigan, P.C.

[57] ABSTRACT

Disclosed is a cocurrent cyclone separator extractor for both the separation of a gas/solid mixture into at least one light phase, and for the extraction of gases sorbed by the solid, comprising a first elongated external enclosure, which has a substantially circular cross-section, having at a first end, external inlet means for the introduction of the mixture, said means making it possible to give at least to the light phase a helical movement in the flow direction of the mixture in said enclosure; an elongated second enclosure, which has a substantially circular cross-section of smaller diameter than the first enclosure, whose end close to the inlet means; and a second external enclosure having a substantially vertical axis of symmetry, connected to said first enclosure, said second enclosure collecting the separated dense phase and having means for the injection of a light extraction phase, injection taking place in countercurrent manner with respect to the flow of the separated dense phase and, at least in part in said dense phase which is at least partly fluidized, the above-mentioned components arranged so that injection of light extraction phase limits flow of light phase in the direction of said second enclosure, and said second enclosure has at least one outlet for the recovery of the at least partly desorbed dense phase, said inlet also functioning as a removal means for said light extraction phase.

23 Claims, 2 Drawing Sheets

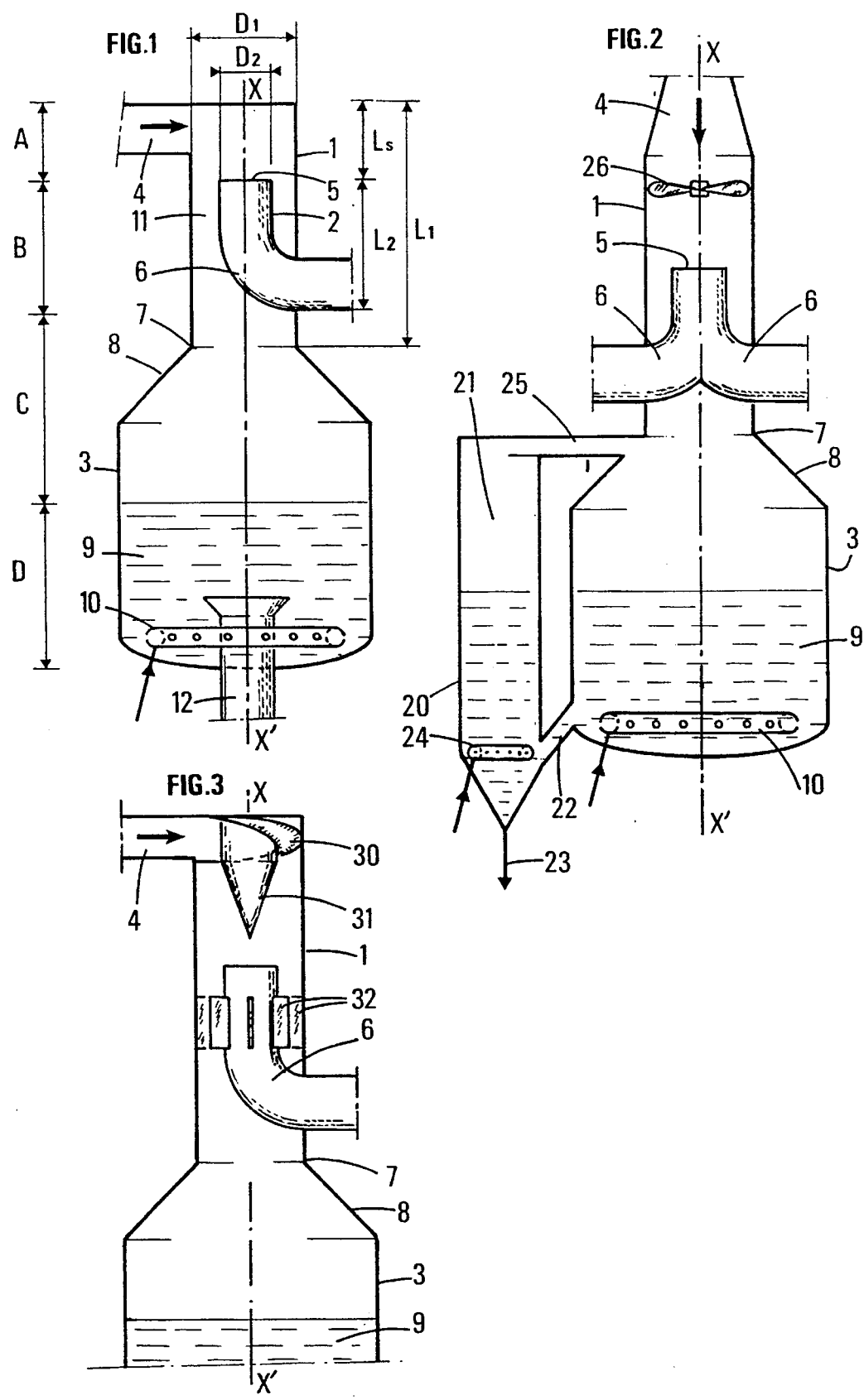

5,586,998

1

CO-CURRENT CYCLONE SEPARATION EXTRACTOR

This application is a continuation of application Ser. No. 7/985,712, filed Dec. 4, 1992, now abandoned.

The invention relates to a cocurrent cyclone separator extractor for the separation of the solid particles from a gas.

In the petroleum industry and more specifically in processes for hydrocarbon charge conversion on catalyst performed in a moving bed, the charge is contacted with the catalyst in a reactor. The weight ratio of the flow rate of the catalyst to the charge flow rate is high and is generally between 1:1 and 15:1 . At the reactor outlet, it is necessary to separate the products of the reaction from the catalytic products, the products of the reaction being entrained to a secondary separation and the solids are recycled with, in certain processes, the regeneration of the catalyst. Before recycling the catalyst, it is important to desorb the hydrocarbon products still present on the surface or within the catalyst in order to recover the products of the reaction which would otherwise be lost.

The present invention relates to equipment making it possible to carry out a feet separation of the gaseous products and the catalyst end recover the products remaining on the catalyst at the end of the separation.

Certain catalytic conversion processes, such as the catalytic cracking of hydrocarbon charges, require a rapid separation of the gaseous products at the end of the catalytic reaction, in order to limit their thermal deterioration.

It can then be advantageous to use cyclone separators directly connected to the reactor (e.g. at the top of a rising bed reactor), rather than make do with an inertial separation in a large volume, which means a long residence time. Examples of hydrocarbon fraction conversion processes with rapid separation are e.g. given in the Patent of Rod et al (U.S. Pat. No. 4,946,656), where the separation is performed in a so-called reverse cyclone separator, or in the Patent of Gauthier et al., (French patent application 90/06937, where separation takes place in a cocurrent cyclone separator.

The rapid separation of the catalytic cracking effluents from hydrocarbon fractions generally leads to improved selectivity, whilst avoiding the formation of products such as gaseous fuel or coke, which are slightly valorized in very large quantities, whilst giving preference to the petrol and light cycle oil selectivity, whose valorization is much higher. However, if this fast separation is not accompanied by an effective extraction (stripping) and is close in time to the separation phase, part of the advantages of the rapid separation will be lost, whilst retaining adsorbed on the catalyst valorizable products which will be thermally deteriorated. In the same way, the desorbed products of the catalyst must be rapidly discharged from the enclosure in which extraction takes place. For example, in U.S. Pat. 4,946,656, the catalyst is discharged from the separating zone by a return leg, which drops into the extractor. The products extracted from the catalyst are supplied to the secondary separation stage, together with the products separated at the rime of separation in a large volume enclosure, where they will also be highly exposed to the thermal deterioration of the products.

It is also possible, as in French Patent 83/20435, to include a dense extraction zone at the base of a reverse cyclone separator, e.g. introduced between the vortex reverse zone and the outlet of the solids. This configuration has the advantage of separating the adsorbed products on the catalyst by a gaseous flow injected into the same catalyst particle-gas primary separation enclosure. The gaseous products of the reaction are then sampled in the upper part of the enclosure performing the separation. A disadvantage of such an apparatus is that in order to maintain acceptable separation performance characteristics, it is necessary to place a deflector between the extraction zone and the separation zone. This deflector makes it possible to guide the gaseous vortex during its reversal into the separation enclosure. Said element must be physically fixed to the body of the separating enclosure. The fastenings will be prejudicial to the regular flow of the solids on the walls and exposed to continuous solid flows, they may rapidly become erroded, which could lead to apparatus malfunctioning.

The present invention aims at avoiding these disadvantages by advantageously utilizing the hydrodynamic properties of the gas/solid flow in a cocurrent cyclone separator, modified by the addition of a container having a large volume in the solid discharge enclosure.

The invention more specifically relates to a cocurrent cyclone separator extractor for the separation of a gas/solid mixture MA, having at least one dense phase DA and a light phase LA, into at least one dense phase and into at least one light phase, with the extraction of the gases sorbed by the solid, said separator extractor comprising:

an enclosure (1), called the first external enclosure, which is elongated along an axis (X), which has a substantially circular cross-section, of internal diameter $D_1$ and length $L_1$, having at a first end, means for the introduction of the mixture MA by a so-called external inlet (4), said means making it possible to give at least to the light phase LA a helical movement in the flow direction of the mixture MA in said enclosure, a so-called internal enclosure (2), which is elongated along the axis (X), has a substantially circular cross-section of diameter $D_2$, which is less than $D_1$ and of length $L_2$, which is less than $L_1$, whose end dose to the outer end (4) located at a distance LS less than $L_1$ from the extreme level of the external inlet (4) constitutes the so-called internal inlet (5) by which penetrates at least part of the light phase LA, said enclosure being extended by at least one pipe (6) permitting the discharge of the light phase LA separated outside the first external enclosure, an enclosure (3), called the second external enclosure, having a substantially vertical axis of symmetry, connected to said first enclosure by an opening of diameter $D_1$, said second enclosure collecting the separated dense phase DA having means (10) for the injection of a light extraction phase LB, injection taking place in countercurrent with respect to the flow of the separated dense phase and at least in part in said dense phase which is at least partly fluidized, and has at least one outlet (12) for the recovery of the at least partly desorbed dense phase DA.

The light phase LB is discharged from the separator extractor mixed with the phase LA by the enclosure (2) and the pipe (6).

Without limiting the scope of the invention, the latter is described hereinafter relative to FIGS. 1 to 5, each of which shows an embodiment of the invention.

BRIEF DESCRIPTION OF THE DRAWINGS

FIG. 1 shows a cyclone separator extractor according to the invention.

FIG. 2 shows another extractor in accordance with the invention, differing by the means used for giving the dense phase and the light phase the vorticity necessary for separation of the phases.

FIG. 3 shows a side view of the apparatus according to the invention, having blade means for controlling the inflow of mixture.

DETAILED DESCRIPTION OF THE DRAWINGS

Figure 4:
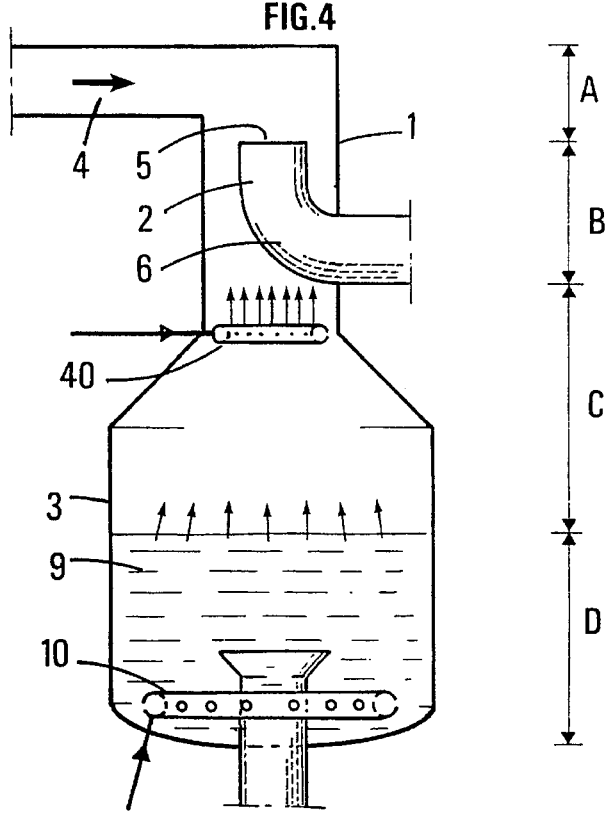
FIG. 4 shows an apparatus in accordance with the invention having means permitting the introduction of the light extraction phase above the bed of dense phase.

FIG. 1 shows a cyclone separator extractor according to the invention. It has substantially regular, elongated, first external enclosure (1) having an axis (X), which is an axis of symmetry, with a substantially circular cross-section of internal diameter $D_1$ and length $L_1$. The axis (X) is generally substantially vertical (FIGS. 1 to 4), but can also be substantially horizontal (FIG. 5).

At one of its ends, the enclosure (1) has a so-called external inlet (4) by which the mixture MA to be treated arrives. Preferably, the mixture MA is introduced by a tangential inlet (4) in a direction substantially perpendicular to the axis of the external enclosure. This tangential inlet preferably has a rectangular or square cross-section, whose side parallel to the axis of the external enclosure has a dimension (Lk) of normally approximately 0.25 to approximately 1 times the diameter $D_1$ and the side perpendicular to the axis of the external enclosure has a dimension (hk) normally approximately 0.05 to approximately 0.5 times the diameter $D_1$.

Means can also be placed within the inlet (4) in order to give downstream in the flow direction of the mixture MA, a helical or whirling movement, at least to the Light phase LA of the mixture MA (FIG. 2). These means are normally inclined blades (cf. FIG. 2). The tangential inlet, the blades or other equivalent means constitute introduction means for the mixture MA.

The separator extractor means according to the invention also have an internal enclosure (2) elongated along an axis (X), which has a substantially circular cross-section and which is positioned coaxial relative to the enclosure (1), having at a distance (Ls), less than ($L_1$), from the extreme level of the external inlet (4), a so called internal inlet (5) with a external diameter $D_2$ smaller than $D_1$. The diameter of the internal inlet (5) is normally approximately 0.2 to approximately 0.9 times the diameter ($D_1$), usually approximately 0.4 to approximately 0.8 times the diameter ($D_1$) and preferably approximately 0.4 to 0.6 times the diameter ($D_1$). The distance (Ls) is normally approximately 0.2 to approximately 9.5 times the diameter ($D_1$) and usually approximately 0.5 to approximately twice the diameter ($D_1$). A relatively short distance between 0.5 and twice the diameter ($D_1$) normally makes it possible to bring about a very rapid separation and a good separating efficiency.

Under the effect of the vortex created, the mixture is at least partly separated into a dense phase DA and a light phase LA. The light phase LA at least partly penetrates the inlet (5) and is discharged to the outside of the enclosure (1) by at least one pipe (6), which extends the enclosure (2). Thus, a separating zone (A) is defined between the extreme level of the inlet (4) and approximately the level of the inlet (5).

The separator extractor means according to the invention also have a so-called second external enclosure (3), which has a cross-section equal to, smaller than or larger than that of the enclosure (1). Preferably, the cross-section of the enclosure (3) is at least equal to that of the enclosure (1) and usually exceeds that of enclosure (1). Generally the cross-section of the enclosure (3) is larger by at least 0.5% abd most frequently at least 25% that of the enclosure (1). The enclosure (3) is connected to the enclosure (1) by an opening (7) having the me diameter $D_1$ as that of the enclosure (1).

Preferably, the enclosure (3) is elongated along an axis and has a substantially circular cross-section of diameter D, preferably exceeding $D_1$. Advantageously, the enclosure (3) is in the extension of the axis (X) of the enclosure (1). FIG. 1 shows it with a conical connection surface (8).

The dense phase DA at least partly separated in the zone A flows to the enclosure (3), in the bottom of which it is collected and then forms a fluidized bed (9). The enclosure (3) has means (10) for the injection into the phase DA of a light extraction phase LB in conutercurrent with respect to the flow of the separated dense phase DA.

Thus, naturally in a cocurrent cyclone separator, the light phase tends to partly circulate in the peripheral space (11) located between the external enclosure (1) and the internal enclosure (2) before passing out of the separator extractor by means of said enclosure (2). The consequence is that in the peripheral space, the solids are maintained on the wall under the effect of the centrifugal force well beyond the level where sampling takes place of the light phase. There can also be an in some cases significant back mixing in said peripheral space.

A simple means for reducing the circulation of the light phase LA in said space is to inject in small quantities a light phase LB in countercurrent with respect to the light phase LA. The injection of the light phase LB can take place at several points simultaneously. It is also possible to inject in this latter case light phases of different compositions. If the injection of the light phase LB is appropriately proportioned, the solids are largely maintained on the periphery at the inlet (5) of the enclosure (2) for sampling the light phases, which avoids any excess entrainment of solids towards the light phase discharge enclosure. Simultaneously the light phase LA is pushed back by the light phase LB injected in countercurrent manner and this limits back mixing.

It is advantageous to use these hydrodynamic properties to limit the back mixing of the separated gaseous light phase LA, as stated hereinbefore, but also in order to aid the good extraction of the products. Thus, the vapours of the light phase LB injected in countercurrent manner and which circulate in the peripheral space (11) make it possible to carry out a very rapid extraction of the reaction products still present on the catalyst.

Moreover, said injection gives the light phase DA in the enclosure (3) the properties of a fluidized medium. The vacuum level of the bed is preferably between 35 and 75%.

The light phase LB is injected in gaseous form. It e.g. comprises water vapour, nitrogen, a hydrocarbon charge vaporized at low boiling point.

The injection means (10) are located in the bottom of the enclosure (3) for injection into the dense phase DA. They are e.g. orifices arranged regularly around a ring centered on the axis of the enclosure (3). From the separating zone A, this makes it possible to define a zone B in which the dense phase DA undergoes a downward flow and where, at least part of the phase LA flows maintaining the dense phase DA on the wall, the light phase LA is discharged, a zone C in which the dense phase DA continues its downward flow and undergoes a partial desorption and finally a zone D in which the dense phase maintained in fluidized bed is partly desorbed and partly discharged.

The means (12) for the discharge of at least part of the dense phase DA are located in the lower part of the enclosure (3), either laterally (disengagement well, e.g. in FIG. 2) or axially (vertical cylindrical well, e.g. in FIG. 1).

FIG. 2 shows another embodiment of the separator extractor according to the invention and which differs from that of FIG. 1 by the means used for giving the dense phase DA ad the light phase LA the vorticity necessary for the separation of the phases. In FIG. 1, the mesas shown are a tangential inlet constituted by a substantially horizontal pipe, which reaches the enclosure (1) tangentially. In FIG. 2 the introduction means used for giving the dense phase DA and the light phase LA the vorticity necessary for the separation of the phases in the zone A are constituted by blades or propellers (26) positioned axially in the inlet (4), which is coaxial to the enclosure (1). The apparatus described relative to FIG. 2 differs from that of FIG. 1 by the number of pipes (6) extending the enclosure (2) for the discharge of the light phase LA. Thus, in order to reduce the size of the supplementary equipment for recovering particles which are not separated in the apparatus according to the invention, it can be advantageous to subdivide the flow of light phase LA into several flows, e.g. by means of several pipes (6), as shown in FIG. 2. Said pipe or pipes are arranged in such a way that the light phase is discharged in a substantially axial direction with respect to the enclosure (1) (cf. e.g. FIG. 5) or in a direction substantially perpendicular to the axis of the enclosure (1) (cf. e.g. FIGS. 1 to 4).

FIG. 2 also shows means (20) for the discharge of the at least partly desorbed dense phase DA (i.e. the reaction products retained by the solid have been at least partly extracted) constituted by an enclosure (21) independent of the enclosures (1), (2) and (3) forming a disengagement well. This enclosure has an inlet (22) in which the dense phase DA, collected in the enclosure (3), flows by gravity, as well as an outlet (23). The dense phase concentration in the outlet (23) is maintained at the desired value by means of the fluidization imposed in the enclosure (21) resulting from an injection of light phase LC by the means (24) and due to a balancing line (25) making it possible to discharge the gas excess LC not entrained at the outlet (23) and which will mix with the phase LB. Advantageously LC is chosen for its desorbing properties. LC can be identical or different to LB. The light phase LC is at least partly used for the fluidization of the dense phase DA in the disengagement well.

FIG. 3 is a side view of an apparatus according to the invention and which also has meeds for controlling the flow of mixture MA in the tangential inlet (4). Thus, it is normally desirable in the case of high flow rates of the different phases present to use means making it possible to aid the formation of the vortex, such as e.g. a downward helical roof (30) from the extreme level of the tangential inlet or an e.g. internal helix (with planar winding), whilst also making it possible to limit turbulence at the tangential inlet. Normally, in the case of a downward helical roof, the pitch of the helix or blade is approximately 0.01 to 3 times the value of Lk and most frequently approximately 0.5 to approximately 1.5 times this value. In order to stabilize the vortex in its advance, it is also possible to have a stabilization cone (31) fixed at the inlet (4) along the axis facing the discharge inlet (5) for the light phase LA. FIG. 3 also shows the means (32) for breaking or interrupting the flow at the wall of the solids.

These means (32) are generally constituted by substantially planar blades, whose plane has the axis (X) of the enclosure (1). These means are preferably fixed to at least one wall of one of the enclosures (1) or (2). They are preferably fixed to the outer wall of the lower enclosure (2), preferably in such a way that the distance LP between the internal inlet and the point of said blades closest to said internal inlet is approximately 0 to approximately 5 times the diameter $D_1$ said preferably approximately 0.1 to approximately 1 times said diameter $D_1$. The number of blades is normally at least 2 and is e.g. 2 to 50 and most frequently 3 to 50. These blades normally have the characteristics of those described in French patent application 90/06937 in the name of the Applicant.

The advantage of using such means is to break the flow at the wall of the solids. They also make it possible to render uniform the distribution of the dense phase DA reaching the enclosure (3), which is very favourable for the extraction of the sorbed products. Finally, they make it possible to homogeneously distribute the solids flowing on the wall over the entire peripheral cross-section of the enclosure (1) surrounding the enclosure (2) or the pipe or pipes (6). It should be noted that, contrary to the rapid separation application (not yet published French patent application 90/06937), the function of the means (32) is not merely to limit the advance of the vortex and reduce back mixing, because here the injection of the light extraction phase LB partly fulfills said function. These means (32) could also be deflectors for improving the contact between the descending phase DA and the light extraction phase LB.

Figure 5:
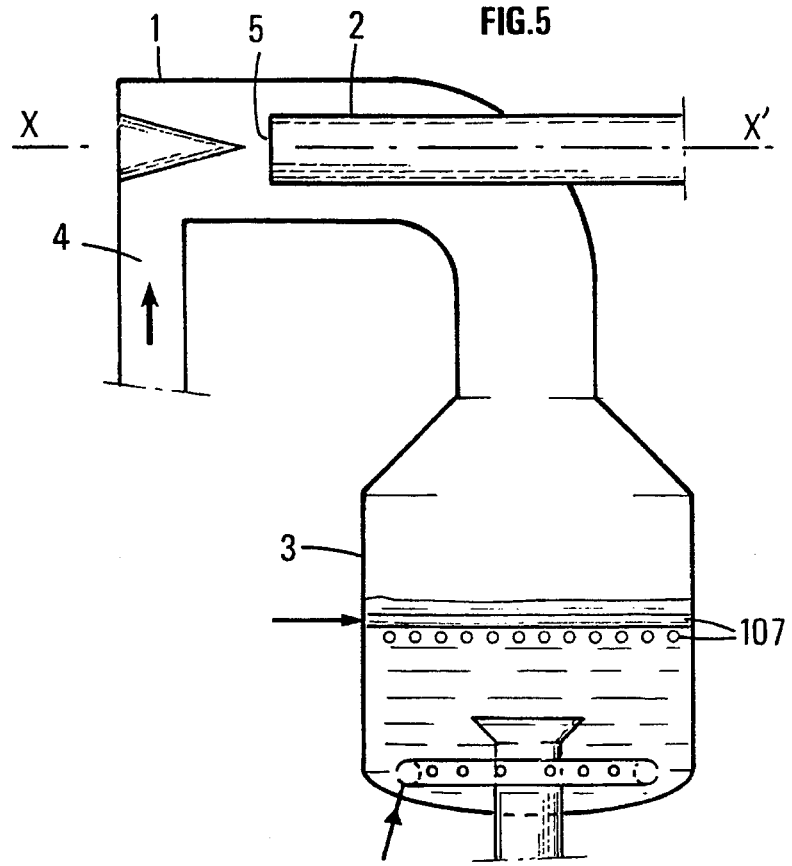
FIG. 5 also show an apparatus according to the invention, but in which the separator extractor axis is positioned horizontally.

In FIG. 4, means (40) have been added and permit the introduction of the light extraction phase LB above the bed of dense phase DA, the light phase LB being injected in conntercurrent with respect to the dense phase DA, which flows from the separating zone A to the enclosure (3). This injection makes it possible to reduce in the dilute phase of solids (flowing from zone A to enclosure (3)), the partial pressure of the desorbed gases (e.g. hydrocarbons) rising from the extraction zone D to the discharge enclosure (2) and therefore favour desorption.

The means (40) are convention gas introduction means (such us a straight or circular pipe provided with orifices) having to respect a maximum homogeneity fluid distribution. These means (40) are therefore positioned at the zone C, i.e. below the enclosure (2) with its discharge pipe (6) and above the solid bed of the zone D.

FIG. 5 diagrammatically shows an apparatus according to the invention and which only differs from that described hereinbefore in that the separator attractor axis (X) is positioned horizontally, which makes it possible to reduce the height of the equipment and can therefore be advantageous in certain cases. However, it is necessary to maintain the axis of the enclosure (3) verticals in order to maintain correct dense phase fluidization.

In order to improve the stripping in the enclosure (3) in the fluidized bed (9), it is possible to insert in the latter means for improving the contacting between the light phase LB and the dense phase DA. These means are e.g. tubes (107) arranged in regular rows on the section of enclosure (3) and shown in FIG. 5. For example, use is made of tubes having a diameter between 0.02 and 0.08 m arranged at intervals of at least once the diameter of the tubes. These tubes could advantageously be used for heating the fluidized bed and aiding the desorption of the products of the reaction.

In the separator extractor means according to the invention the residence time of the solids constituting the dense phase DA in the fluidized bed (9) is normally approximately 10 seconds to approximately 15 minutes and usually is approximately 30 seconds to approximately 10 minutes.

Most frequently the ratio of the surface speed of the phase LB to the minimum fluidization speed (linked with the properties of the dense phase DA and the light phase LB) is approximately 1:1 to 500:1 and preferably 10:1 to 100:1.

The residence time of the solid particles of the phase DA in the peripheral space (11) (zones B and C) normally varies between $10^{-1}$s and 100s and is preferably, e.g. in a separator extractor of diameter $D_1$ of 50 cm, 3 to 15s.

The separator extractor means according to the invention can be used for rapid separation on the basis of a mixture MA comprising a dense phase DA and a light phase LA, of said dense phase and said light phase and the extraction of products adsorbed by said dense phase DA. The mixture to be separated can be a mixture obtained as a result of a chemical reaction and having at least one phase contributing to said reaction.

EXAMPLE

Tests were carried out on a separator extractor, like that shown in FIG. 3 and having the following geometry:

- enclosure (1): cylindrical, diameter 5 cm, length 75 cm, with tangential input hating a rectangular Cross-section (2.5 cm ×1.3 cm, the largest side being parallel to the axis (X)) with a helical roof and a stabilization cone with a height of 6 cm;
- enclosure (2): Ls=12.5 cm, the outlet of the discharge pipe being 55 cm from the extreme level of the tangential inlet (the dimension $L_2$ being equal to 42.5 cm), the external diameter of the enclosure (2) being 2.5 cm and its internal diameter 2.3 cm;
- enclosure (3): cylinder, diameter 30 cm, height 1.2 m.

The volume flow rate $Q_2$ of the catalyst/gas mixture MA which enters is $8.3\times10^{-3}$m$^3$/s, which corresponds to a surface speed of 25 m/s for the light phase present in the mixture MA on entering the separator extractor. Various experiments were carried out, the flow rate of the extraction light phase LB (in volume $Q_1$) having varied by 0 to 15% from the flow rate $Q_2$. Under these conditions, the passage speed in the peripheral space (11) is below 20 cm/s.

The following results were obtained with the FCC catalyst of average diameter 65 micrometers under ambient temperature and pressure conditions, the light phases LA and LB being air.

They show that such a separator extractor is completely operational, because in the range of the flow rate of the phase LB injected in countercurrent manner (ratio Q1/Q2 corresponding to our experiments), there is a relatively small separation efficiency reduction.

| Flow rate of solid used in mixture MA | Q1/Q2 % | Separating efficiency | Lo | Pa − Pd Pascal |
| --- | --- | --- | --- | --- |
| 22 g/s | 0 | 99.98 | 2.0 | 2800 |
| 22 g/s | 1.67 | 99.97 | 2.0 | 2800 |
| 22 g/s | 2.69 | 99.96 | 2.0 | 2700 |
| 22 g/s | 5.28 | 99.95 | 2.0 | 2700 |
| 69 g/s | 0 | 99.99 | 6.4 | 3000 |
| 68 g/s | 2.7 | 99.97 | 6.3 | 2700 |
| 71 g/s | 5.3 | 99.88 | 6.6 | 3000 |

Lo = solid mass ratio on gases in the mixture MA.

-continued

| Flow rate of solid used in mixture MA | Q1/Q2 % | Separating efficiency | Lo | Pa − Pd Pascal |
| --- | --- | --- | --- | --- |

Pa = pressure upstream of (4).
Pd = pressure at the outlet of the light phase discharge pipe (6).

It can be seen that the apparatus according to the invention has major advantages compared with apparatuses proposed in the literature. It permits a rapid separation, a dilute phase extraction and a deep dense phase extraction.

I claim:

1. Cocurrent cyclone separator extractor for both the separation of a gas/solid mixture MA, having at least one dense phase DA and a light phase LA, into at least one dense phase and into at least one light phase, and for the extraction of gases sorbed by the solid, said separator extractor comprising:

a first external enclosure (1), which is elongated along an axis (X), which has a substantially circular cross-section, of internal diameter $D_1$ and length $L_1$, having at a first end, external inlet means (4) for the introduction of the mixture MA, said means making it possible to give at least to the light phase LA a helical movement in the flow direction of the mixture MA in said enclosure, an internal enclosure (2), which is elongated along the axis (X), which has a substantially circular cross-section of diameter $D_2$, which is less than $D_1$, and of length $L_2$, which is less than $L_1$, whose and close to inlet means (4) is located at a distance LS, which is less than $L_1$, from the extreme level of inlet means (4), and constitutes the internal inlet (5) by which penetrates at least part of the light phase LA, said internal enclosure being extended by at least one pipe (6) permitting the discharge of the light phase LA separated outside the first external enclosure, a second external enclosure (3) having a substantially vertical axis of symmetry, connected to said first enclosure by an opening of diameter $D_1$, said second enclosure collecting the separated dense phase DA and having means (10) for the injection of a light extraction phase LB, injection taking place in countercurrent manner with respect to the flow of the separated dense phase and, at least in part in said dense phase which is at least partly fluidized, the above-mentioned components arranged so that injection of light extraction phase LB limits flow of light phase LA in the direction of said second enclosure, and said second enclosure has at least one outlet (12) for the recovery of the at least partly desorbed dense phase DA, said inlet (5) also functioning as a removal means for said light extraction phase LB.

2. Separator extractor according to claim 1, wherein the second external enclosure (3) is located in the extension of the first eternal enclosure along the axis (X).

3. Separator extractor according to claim 1, wherein the second external enclosure (3) is elongated along an axis and has a substantially circular cross-section of diameter D greater then $D_1$.

4. Separator extractor according to claim 1, wherein a vertical cylindrical well located on the axis of the second external enclosure (3) constitutes the dense phase outlet (12).

5. Separator extractor according to claim 1, further comprising a disengagement well through which the dense phase passes.

6. Separator extractor according to claim 5, further comprising means in the disengagement wall for injecting the light fluidization phase.

7. Separator extractor according to claim 1, wherein the means (10) for the injection of the light extraction phase are constituted by a ring centered on the axis of the second enclosure (3) and provided with orifices directed towards the opening (7).

8. Separator extractor according to claim 1, further comprising means (40) for light extraction phase injection above the dense phase bed and in countercurrent with respect to the separated dense phase flow.

9. Separator extractor according to claim 1, further comprising means (32) for rendering uniform the distribution of the separated dense phase arriving in the second external enclosure (3), for breaking the flow on the wall of the solids, and for improving contact between dense phase DA and light extraction phase LB.

10. Separator extractor according to claim 9, wherein the means (32) comprises blades.

11. Separator extractor according to claim 10, wherein the blades are fixed to the outer well of the internal enclosure (2).

12. Separator extractor according to claim 1, wherein the pipe or pipes (6) are arranged in such a way that the light phase is discharged in a substantially axial direction with respect to the first external enclosure (1).

13. Separator extractor according to claim 1, wherein the pipe or pipes (6) are arranged in such a way that the light phase is discharged in a direction substantially perpendicular to the axis of the first external enclosure.

14. Separator extractor according to claim 1, wherein the means for introducing the mixture MA comprises an inlet (4) tangential to the enclosure (1).

15. Separator extractor according to claim 1, wherein the means for introducing the mixture MA comprises blades (26) placed in the inlet.

16. Separator extractor according to claim 1, wherein the means for introducing the mixture MA comprises a helical roof.

17. Separator extractor according to claim 1, further comprising a vortex stabilization cone (31) located at the inlet (4) along the axis facing the inlet (5).

18. Separator extractor according to claim 1, the second external enclosure (3) having means for improving contacting between the light phase LB and the dense phase DA.

19. A method of using a separator extractor according to claim 1, for the rapid separation, from a mixture MA comprising the dense phase DA and a light phase LA, of said dense phase and said light phase and the extraction of the products adsorbed by said dense phase DA.

20. A method according to claim 19, wherein the mixture to be separated is a mixture obtained at the and of a chemical reaction and having at least one phase contributing to said reaction.

21. Separator extractor according to claim 9, wherein the means (32) comprises the light extraction phase LB.

22. Cocurrent cyclone separator extractor for both the separation of a gas/solid mixture MA, having at least one dense phase DA and a light phase LA, into at least one dense phase and into at least one light phase, and for the extraction of the gases sorbed by the solid, said separator consisting of:

a first external enclosure (1), which is elongated along an axis (X), has a substantially circular cross section of internal diameter $D_1$ and length $L_1$, said first enclosure having, at a first end, means for the introduction of the mixture MA by an external inlet (4), said means making it possible to give at least to the light phase LA a helical movement in the flow direction of the mixture MA in said enclosure;

an internal enclosure (2), which is elongated along the axis (X), has a substantially circular cross section of diameter $D_2$, which is less than $D_1$, and of length $L_2$, which is less than $L_1$, whose and close to inlet (4) is located at a distance LS, which is less than $L_1$, from the extreme level of the external inlet (4), and constitutes the internal inlet (5) by which at least part of the light phase LA penetrates, said enclosure being extended by at least one pipe (6), permitting the discharge of the light phase LA separated outside the first external enclosure;

a second external enclosure (3), having a substantially vertical axis of symmetry, connected to said first enclosure by an opening of diameter $D_1$, said second enclosure collecting the separated dense phase DA and having means (10) for the injection of a light extraction phase LB, injection taking place in countercurrent manner with respect to the flow of the separated dense phase and, at least in part, in said dense phase, which is at least partly fluidized, the above-mentioned components arranged so that injection of light extraction phase LB limits flow of light phase LA in the direction of said second enclosure and said second enclosure has at least one outlet (12) for the recovery of the at least partly desorbed dense phase DA, said inlet (5) also functioning as a removal means for said light extraction phase LB.

23. Separator extractor according to claim 22, further comprising means (32) for rendering uniform the distribution of the separated dense phase arriving in the second external enclosure (3), for breaking the flow on the wall of the solids, and improving contact between dense phase DA and light extraction phase LB.

\* \* \* \* \*